(12) United States Patent
Moravek et al.

(10) Patent No.: US 10,096,253 B2
(45) Date of Patent: Oct. 9, 2018

(54) METHODS AND SYSTEMS FOR PRESENTING DIVERSION DESTINATIONS

(71) Applicant: HONEYWELL INTERNATIONAL INC., Morris Plains, NJ (US)

(72) Inventors: Zdenek Moravek, Rozdrojovice (CZ); David Kunes, Tisnov (CZ); Filip Magula, Albrechtice (CZ); Katerina Sprinarova, Hradec Kralove (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 124 days.

(21) Appl. No.: 14/953,635

(22) Filed: Nov. 30, 2015

(65) Prior Publication Data

US 2017/0154537 A1    Jun. 1, 2017

(51) Int. Cl.
*G08G 5/00*    (2006.01)
*B64D 43/00*    (2006.01)

(52) U.S. Cl.
CPC .......... *G08G 5/0056* (2013.01); *B64D 43/00* (2013.01); *G08G 5/0039* (2013.01)

(58) Field of Classification Search
None
See application file for complete search history.

(56) References Cited

U.S. PATENT DOCUMENTS

| | | | |
|---|---|---|---|
| 5,398,186 A | 3/1995 | Nakhla | |
| 5,842,142 A * | 11/1998 | Murray | G01C 21/00 701/16 |
| 6,199,008 B1 | 3/2001 | Aratow et al. | |
| 6,381,535 B1 | 4/2002 | Durocher et al. | |
| 6,542,796 B1 | 4/2003 | Gibbs et al. | |
| 7,342,514 B1 | 3/2008 | Bailey et al. | |

(Continued)

FOREIGN PATENT DOCUMENTS

| | | |
|---|---|---|
| EP | 2317488 A2 | 5/2011 |
| EP | 2355071 A1 | 8/2011 |

(Continued)

OTHER PUBLICATIONS

FlightGear Forum; Using a Canvas Map in the GUI; 2012.

(Continued)

*Primary Examiner* — Truc M Do
(74) *Attorney, Agent, or Firm* — Lorenz & Kopf, LLP

(57) ABSTRACT

Methods and systems are provided for presenting a list of potential diversion destinations. One exemplary method involves obtaining status information associated with the vehicle, obtaining status information associated with respective ones of a plurality of destinations, and classifying the plurality of destinations into a plurality of viability groups based at least in part on the status information associated with the vehicle and the respective status information associated with each respective destination. Each of the viability groups contains a subset of the plurality of destinations. The method continues by displaying a list of the plurality of destinations on a display device associated with the vehicle, with the plurality of destinations being ordered in the list based at least in part on their respective viability group classifications. In this regard, destinations classified into higher viability groups may be preferentially displayed over destinations classified into lower viability groups.

20 Claims, 6 Drawing Sheets

(56) References Cited

U.S. PATENT DOCUMENTS

| | | | |
|---|---|---|---|
| 7,499,771 B2* | 3/2009 | Caillaud | G01C 23/00 340/961 |
| 7,796,055 B2 | 9/2010 | Clark et al. | |
| 7,908,078 B2 | 3/2011 | He | |
| 7,963,618 B2 | 6/2011 | Stone et al. | |
| 7,996,121 B2 | 8/2011 | Ferro et al. | |
| 8,010,242 B1 | 8/2011 | Ginsberg et al. | |
| 8,026,831 B2 | 9/2011 | Muramatsu et al. | |
| 8,112,186 B2 | 2/2012 | Sylvester | |
| 8,135,500 B1 | 3/2012 | Robinson | |
| 8,200,378 B1 | 6/2012 | Chiew et al. | |
| 8,214,136 B2 | 7/2012 | Caillaud | |
| 8,292,234 B2 | 10/2012 | Shuster | |
| 8,521,343 B2 | 8/2013 | Spinelli | |
| 8,554,457 B2 | 10/2013 | White et al. | |
| 8,565,944 B1* | 10/2013 | Gershzohn | G08G 5/0039 701/1 |
| 8,612,070 B2 | 12/2013 | Geoffrey et al. | |
| 8,615,337 B1 | 12/2013 | McCusker et al. | |
| 8,666,649 B2* | 3/2014 | Otto | G06Q 10/06 701/120 |
| 8,676,481 B2* | 3/2014 | Coulmeau | G08G 5/0021 701/122 |
| 8,723,686 B1 | 5/2014 | Murray et al. | |
| 8,849,478 B2 | 9/2014 | Coulmeau et al. | |
| 9,047,769 B2 | 6/2015 | Lafon et al. | |
| 9,064,407 B2* | 6/2015 | Otto | G06Q 10/06 |
| 9,098,996 B2 | 8/2015 | Barraci et al. | |
| 9,310,222 B1 | 4/2016 | Suiter et al. | |
| 9,423,799 B1 | 8/2016 | Wu et al. | |
| 9,567,099 B2 | 2/2017 | Poux et al. | |
| 9,646,503 B2 | 5/2017 | Kawalkar et al. | |
| 2004/0030465 A1* | 2/2004 | Conner | G01S 19/15 701/16 |
| 2005/0049762 A1 | 3/2005 | Dwyer | |
| 2006/0025901 A1 | 2/2006 | Demortier et al. | |
| 2007/0050098 A1 | 3/2007 | Caillaud | |
| 2007/0078591 A1 | 4/2007 | Meunier et al. | |
| 2007/0241936 A1 | 10/2007 | Arthur et al. | |
| 2007/0299598 A1 | 12/2007 | Fetzmann et al. | |
| 2008/0010005 A1* | 1/2008 | Small | G08G 5/00 701/120 |
| 2008/0300737 A1 | 12/2008 | Sacle et al. | |
| 2009/0150012 A1 | 6/2009 | Agam et al. | |
| 2009/0171560 A1 | 7/2009 | McFerran et al. | |
| 2010/0036552 A1 | 2/2010 | Pepitone et al. | |
| 2010/0161156 A1* | 6/2010 | Coulmeau | G08G 5/0021 701/3 |
| 2010/0194601 A1 | 8/2010 | Servantie et al. | |
| 2010/0198433 A1 | 8/2010 | Fortier | |
| 2011/0264312 A1 | 10/2011 | Spinelli et al. | |
| 2012/0218127 A1* | 8/2012 | Kroen | G08G 5/0034 340/945 |
| 2012/0245836 A1* | 9/2012 | White | G08G 5/065 701/120 |
| 2013/0001355 A1 | 1/2013 | Cox et al. | |
| 2013/0046422 A1 | 2/2013 | Cabos | |
| 2013/0090842 A1 | 4/2013 | Stabile | |
| 2013/0103297 A1 | 4/2013 | Bilek et al. | |
| 2013/0179011 A1 | 7/2013 | Colby et al. | |
| 2013/0179059 A1* | 7/2013 | Otto | G06Q 10/06 701/120 |
| 2013/0204470 A1 | 8/2013 | Luckner et al. | |
| 2013/0218374 A1 | 8/2013 | Lacko et al. | |
| 2013/0271300 A1 | 10/2013 | Pepitone et al. | |
| 2013/0304349 A1 | 11/2013 | Davidson | |
| 2014/0278056 A1 | 9/2014 | Williams et al. | |
| 2014/0309821 A1* | 10/2014 | Poux | G08G 5/0021 701/14 |
| 2014/0343765 A1 | 11/2014 | Suiter et al. | |
| 2014/0350753 A1* | 11/2014 | Depape | B64D 45/00 701/3 |
| 2015/0015421 A1 | 1/2015 | Krijger et al. | |
| 2015/0081197 A1 | 3/2015 | Gaertner et al. | |
| 2015/0120098 A1 | 4/2015 | Catalfamo et al. | |
| 2015/0142222 A1* | 5/2015 | Choi | G08G 5/0034 701/3 |
| 2015/0241295 A1 | 8/2015 | Fuscone et al. | |
| 2015/0279218 A1 | 10/2015 | Irrgang et al. | |
| 2015/0371544 A1 | 12/2015 | Mere | |
| 2016/0063867 A1 | 3/2016 | Zammit et al. | |
| 2016/0085239 A1 | 3/2016 | Boyer et al. | |
| 2016/0116917 A1 | 4/2016 | Bataillon et al. | |
| 2016/0229554 A1 | 8/2016 | Kawalkar et al. | |
| 2017/0168658 A1 | 6/2017 | Lacko et al. | |

FOREIGN PATENT DOCUMENTS

| | | |
|---|---|---|
| EP | 1963888 B1 | 1/2013 |
| EP | 2574965 A2 | 4/2013 |
| EP | 2657922 A2 | 10/2013 |
| EP | 2657923 A2 | 10/2013 |
| EP | 2790168 A2 | 10/2014 |
| EP | 2800082 A2 | 11/2014 |
| EP | 2980774 A1 | 2/2016 |
| GB | 1153847 A | 5/1969 |
| WO | 01/57828 A1 | 8/2001 |
| WO | 2007006310 A2 | 1/2007 |
| WO | 2012145608 A1 | 10/2012 |
| WO | 2013162524 A1 | 10/2013 |

OTHER PUBLICATIONS

Automated Ceiling Reports ForeFlight; 2015.

IPad Pilot News; 10 tips to increase your runway awareness with ForeFlight; 2015.

Moravek, Z. et al.; Methods and Systems for Safe Landing at a Diversion Airport; Filed on Feb. 9, 2016 and assigned U.S. Appl. No. 15/019,650.

Moravek, Z. et al.; Methods and Systems Facilitating Holding for an Unavailable Destination; Filed on Feb. 9, 2016 and assigned U.S. Appl. No. 15/019,675.

Moravek, Z. et al.; Methods and Systems Facilitating Stabilized Descent to a Diversion Airport; Filed on Feb. 18, 2016 and assigned U.S. Appl. No. 15/047,355.

Moravek, Z. et al.; Methods and Systems for Conveying Destination Viability; Filed on May 3, 2016 and assigned U.S. Appl. No. 15/145,346.

Chmelarova et al.; Methods and Systems for Presenting En Route Diversion Destinations; Filed on Sep. 7, 2016 and assigned U.S. Appl. No. 15/258,400.

Moravek, Z. et al.; Flight Plan Segmentation for En Route Diversion Destinations; Filed on Nov. 21, 2016 and assigned U.S. Appl. No. 15/357,086.

USPTO Notice of Allowance for U.S. Appl. No. 15/019,675 dated Jan. 26, 2017.

Extended EP Search Report for Application No. 16197629.5-1803 dated Jul. 4, 2017.

Haroon, K; FMC Alternate Airport and Diversion; The Airline Pilots Forum & Resource, 2012.

Atkins, E.M. et al.; Emergency Flight Planning Applied to Total Loss of Thrust; Journal of Aircraft vol. 43, No. 4, Jul.-Aug. 2006.

ForeFlight Mobile Product Page Nov. 19, 2015; Reference Notes Last accessed at http://foreflight.com/products/foreflight-mobile.

AVPlan EFB Plan Faster, Fly Sooner Nov. 19, 2015; Reference Notes Last accessed at http://www.avplan-efb.com/avplan.

AivlaSoft Electronic Flight Bag—Cockpit efficiency and situational awareness Nov. 19, 2015; Reference Notes Last accessed at http://www.aivlasoft.com/index.html.

Iopscience Landing on empty: estimating the benefits from reducing fuel uplift in US Civil Aviation, iopscience Dec. 31, 2015; Reference Notes http://iopscience.iop.org/article/10.1088/1748-9326/10/9/094002/pdf.

Stackexchange aviation http://aviation.stackexchange.com/ Dec. 31, 2014; Reference Notes http://aviation.stackexchange.com/questions/2854/when-are-aircraft-required-to-dump-fuel-for-emergency-landings.

(56) References Cited

OTHER PUBLICATIONS

What to Consider Overweight Landing? aero quarterly Dec. 31, 2007; Reference Notes http://www.boeing.com/commercial/aeromagazine/articles/qtr_3_07/AERO_Q307_article3.pdf.
USPTO Office Action for U.S. Appl. No. 15/145,346 dated Jun. 14, 2017.
USPTO Restriction Requirement for U.S. Appl. No. 15/047,355 dated Jun. 19, 2017.
Extended EP Search Report for Application No. 17152071.1-1557 dated Jul. 3, 2017.
Partial EP Search Report for Application No. 17152945.6-1803 dated Jul. 7, 2017.
Extended EP Search Report for Application No. 17151896.2-1557 dated Jul. 11, 2017.
Partial EP Search Report for Application No. 17164877.7-1803 dated Sep. 26, 2017.
USPTO Notice of Allowance for U.S. Appl. No. 15/145,346 dated Sep. 27, 2017.
USPTO Office Action for U.S. Appl. No. 15/047,355 dated Oct. 16, 2017.
Extended EP Search Report for Application No. 17164877.7 dated Feb. 13, 2018.
Extended EP Search Report for Application No. 17152945.6-1803 / 3208787 dated Nov. 7, 2017.
USPTO Office Action for U.S. Appl. No. 15/258,400 dated Dec. 14, 2017.

* cited by examiner

METHODS AND SYSTEMS FOR PRESENTING DIVERSION DESTINATIONS

TECHNICAL FIELD

The subject matter described herein relates generally to vehicle display systems and related human factors, and more particularly, embodiments of the subject matter relate to aircraft systems capable of intelligently resolving the complex status of potential diversion airports and presenting them in an intuitive and digestible manner to reduce a pilot's workload and improve the pilot's workload and situational awareness when selecting a diversion airport.

BACKGROUND

Pilots, air traffic controllers, airline personnel and the like routinely monitor meteorological data, reports, and forecasts to assess any potential impacts on the current or anticipated flight plan and the intended destination. However, in situations where the aircraft needs to deviate from the original plan, such as an emergency situation, the information needs to be reanalyzed with respect to the deviation to facilitate continued safe operation. For example, in the case of an emergency landing, ideally a pilot would select an airport within range of the aircraft where landing is least likely to be compromised or complicated by weather or other factors. This requires consideration of numerous pieces of information (e.g., fuel remaining and distance to be traveled, weather radar and/or forecast information, NOTAMs, SIG-METs, PIREPs, and the like), which often is distributed across different displays or instruments, requiring the pilot to mentally piece together all the different information from the different sources. Additionally, in the case where the information for the first airport analyzed discourages landing there, the pilot must repeat the task of aggregating and analyzing the information for one or more additional airports. Moreover, the time-sensitive nature of the aircraft operation can increase the stress on the pilot, which, in turn, increases the likelihood of pilot error. Accordingly, it is desirable to reduce the mental workload of the pilot (or air traffic controller, or the like) and provide an accurate and reliable comprehensive view of a complex situation.

BRIEF SUMMARY

Methods and systems are provided for presenting potential diversion destinations for a vehicle, such as an aircraft. One exemplary method involves obtaining status information associated with the vehicle, obtaining status information associated with respective ones of a plurality of destinations, and classifying the plurality of destinations into a plurality of viability groups based at least in part on the status information associated with the vehicle and the respective status information associated with each respective destination. Each of the viability groups contains a subset of the plurality of destinations. The method continues by displaying a list of the plurality of destinations on a display device associated with the vehicle, with the plurality of destinations being ordered in the list based at least in part on their respective viability group classifications. In this regard, destinations classified into higher viability groups may be preferentially displayed over destinations classified into lower viability groups.

An apparatus for a vehicle system is also provided. The system includes a display device onboard the vehicle, a communications system onboard the vehicle, one or more systems onboard the vehicle to obtain values for a first set of one or more base parameters indicative of the current vehicle status, and a processing system coupled to the communications system, the one or more systems onboard the vehicle, and the display device. The processing system obtains, via the communications system, for each destination of a plurality of potential diversion destinations identified by the processing system, values for a second set of one or more base parameters indicative of the current status of that respective destination. The processing system classifies each potential diversion destination into a respective one of a plurality of viability groups based at least in part on the current values corresponding to the current vehicle status and the values corresponding to the current status of the particular destination. In this regard, each viability group of the plurality of viability groups contains a subset of the potential diversion destinations. The processing system then displays a listing of the potential diversion destinations on the display device onboard the vehicle, with the listing being ordered based at least in part on the respective viability group classifications. As a result, destinations classified into higher viability groups may be preferentially presented to the vehicle operator over other destinations classified into lower viability groups.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
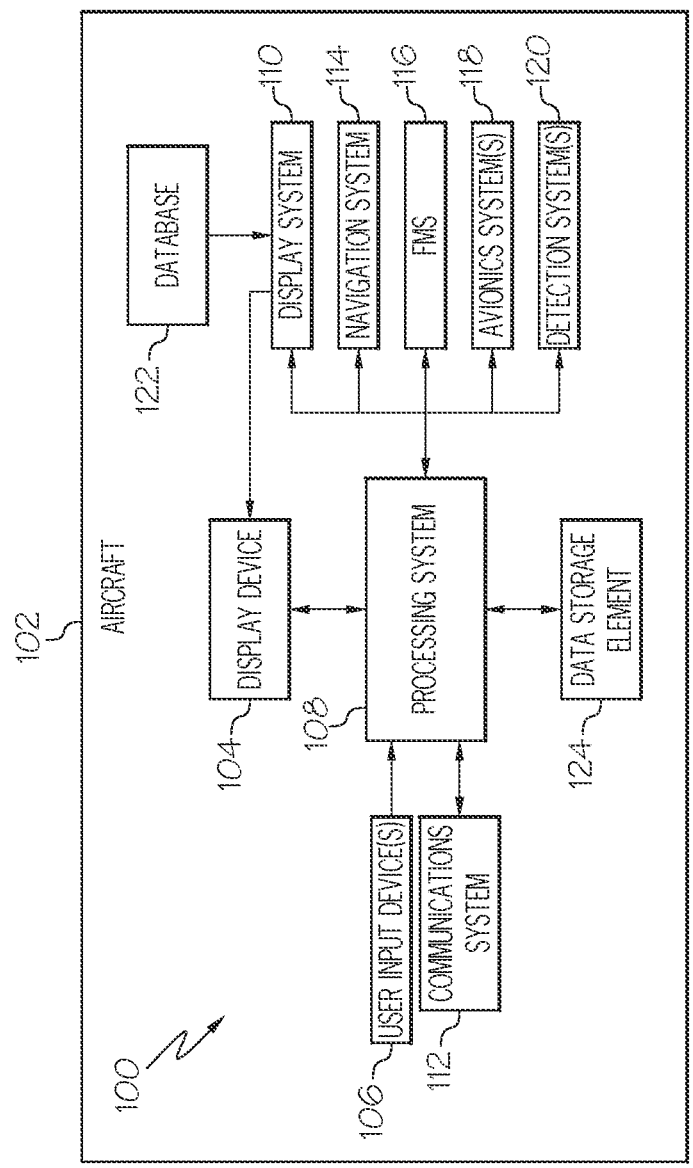
FIG. 1 is a block diagram of a system for an aircraft in an exemplary embodiment.

Embodiments of the subject matter described herein generally relate to systems and methods for intelligently presenting potential diversion destinations to a vehicle operator in a manner that reduces workload while improving situational awareness with respect to an otherwise complex situation. For example, a pilot looking to divert from an originally scheduled flight plan and land the aircraft may be faced with numerous potential landing locations, with each being associated with its own unique set of factors or current circumstances that may make that location more or less suitable for landing the aircraft, while also having to account for the current operations of the aircraft (and any operational problems associated therewith). While the subject matter is primarily described herein in the context of presenting potential diversion airports for an aircraft looking to deviate from a flight plan, the subject matter described herein may be similarly utilized in other applications to deviate from a predefined route for travel (e.g., a travel plan or travel route) or with another vehicle (e.g., automobiles, marine vessels, trains). That said, for purposes of explanation, but without limitation, the subject matter is described herein in the context of presenting information pertaining to aircraft operations.

As described in greater detail below, potential diversion destinations are scored, graded, or otherwise quantified in terms of their respective viabilities in real-time based at least in part on the current vehicle status as well as the current status of each respective destination, which may also include or otherwise account for the current status of the route between the current vehicle location and the respective destination. Thus, when either the current status of the vehicle (e.g., fuel remaining, aircraft weight, etc.) or the current status of a particular destination or the route thereto (e.g., adverse weather conditions, closed or limited runways, etc.) has potential to complicate use of that destination, the viability of that particular destination is characterized as having a lower viability than it may otherwise have been absent such complicating factors. In exemplary embodiments, for each potential destination, parameters characterizing the current vehicle status, the current destination status and the current route status for the route between the vehicle and the destination are classified, categorized, or otherwise assigned to a respective parameter group. For each parameter group, a quantitative viability score and a discrete qualitative viability state are calculated or otherwise determined based on the values of the parameters assigned to that parameter group. Thus, each potential destination has a plurality of parameter group viability scores and a plurality of parameter group viability states associated therewith which are indicative of the current viability of that destination.

Each destination is then classified, categorized, or otherwise assigned to a particular aggregate viability group based on its associated parameter group viability states. In this regard, each aggregate viability group is a unique subset of the potential destinations having substantially the same viability across the parameter groups. Within each viability group, the destinations are then ranked, sorted, or otherwise ordered relative to other destinations in that group based on their associated parameter group viability scores. A listing of the potential destinations is then displayed or otherwise presented, with the destinations within the listing being ranked, sorted, or otherwise ordered primarily by their viability groupings, and then ranked, sorted, or otherwise ordered secondarily within the viability groupings in a manner that reflects the parameter group viability scores. In this regard, destinations in the higher viability groups are displayed preferentially (or with precedence) over destinations in lower viability groups, and within those groups, destinations having higher quantitative viability are displayed preferentially (or with precedence) over destinations in that group. Thus, a vehicle operator can quickly discern which destinations are more or less viable relative to other destinations. It should be noted the subject matter is not necessarily limited to vehicle operators and may be utilized by dispatchers, air traffic controllers, or other users, as appropriate.

Additionally, graphical indicia representative of the parameter group viability states associated with each potential destination are also displayed within the listing in association with the destination. Thus, a vehicle operator or other user can also quickly ascertain each potential destination's qualitative viability across a number of different categories, while concurrently gauging that destination's qualitative viability relative to other potential destinations. Moreover, in some embodiments, graphical indicia representative of the parameter group viability states associated with each potential destination may also be utilized to graphically represent that particular destination on a navigational map, for example, by displaying graphical indicia representative of the parameter group viability states for a destination on the navigational map at the location corresponding to the geographic location of that destination. Thus, a vehicle operator or other user can concurrently achieve situational awareness of the viability characteristics of particular destination displayed on the navigational map while also maintaining awareness of the location of that destination relative to the vehicle.

Figure 4:
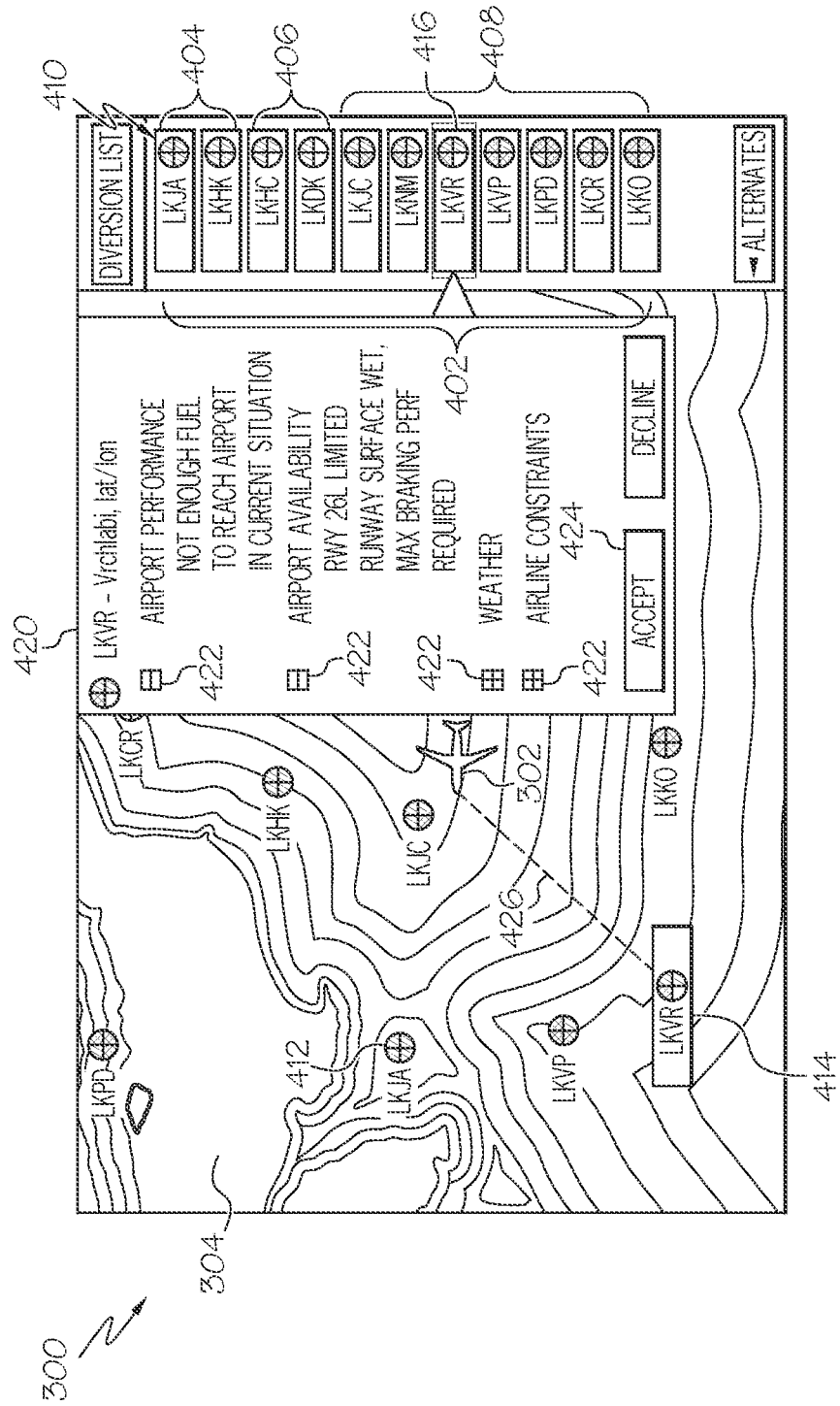

For example, as illustrated in FIG. 4 and described in greater detail below in the context of FIGS. 5-6, the current (or most recent) values for base parameters representative of (or indicative of) a current status of the aircraft (e.g., fuel remaining, aircraft weight, altitude, airspeed, heading, mechanical configuration, and the like) may be obtained using systems onboard the aircraft, while current (or most recent) values for base parameters representative of (or indicative of) the current status of potential diversion airports may be obtained from external systems. For each potential diversion airport, parameter group viability states and parameter group viability scores are determined for each of a plurality of parameter groups using the current base parameter values for the aircraft status and the current base parameter values for the airport status, along with any base parameter values characterizing the current status of the route to the airport and/or complex parameter values calculated for the airport using the base parameters. The potential diversion airports are then classified into different airport viability groupings, and then the airports are ranked within their associated viability grouping based on their associated viability scores for the parameter groups. A listing of the potential diversion airports is then displayed on the display device onboard the aircraft, with the airports sorted primarily by viability grouping and secondarily by their cumulative viability scores across the parameter groups, and with the entries for each of the airports in the list including graphical indicia representative of its viability.

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the data storage element 122 also maintains status information for the runways and/or taxi paths at the airport indicating whether or not a particular runway and/or taxi path is currently operational along with directional information for the taxi paths (or portions thereof). The data storage element 122 may also be utilized to store or maintain other information pertaining to the airline or aircraft operator (e.g., contractual agreements or other contractual availability information for particular airports, maintenance capabilities or service availability information for particular airports, and the like) along with information pertaining to the pilot and/or co-pilot of the aircraft (e.g., experience level, licensure or other qualifications, work schedule or other workload metrics, such as stress or fatigue estimates, and the like).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, the audio output device 105, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, the audio output device 105, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
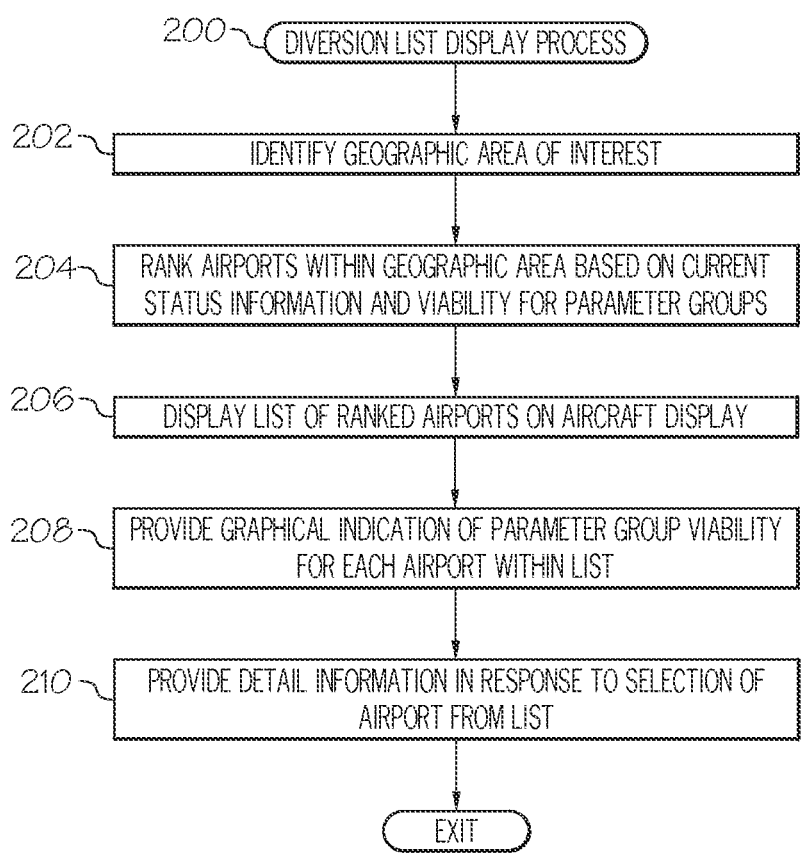
FIG. 2 is a flow diagram of an exemplary diversion list display process suitable for use with the aircraft in the system of FIG. 1 in accordance with one or more embodiments.

Referring now to FIG. 2, in an exemplary embodiment, the system 100 is configured to support a diversion list display process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the diversion list display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the diversion list display process 200 may include any number of additional or alternative tasks, the tasks need not be performed in the illustrated order and/or the tasks may be performed concurrently, and/or the diversion list display process 200 may be incorporated into a more comprehensive procedure or process having additional functionality not described in detail herein. Moreover, one or more of the tasks shown and described in the context of FIG. 2 could be omitted from a practical embodiment of the diversion list display process 200 as long as the intended overall functionality remains intact.

Still referring to FIG. 2, and with continued reference to FIG. 1, in an exemplary embodiment, the diversion list display process 200 begins by identifying or otherwise determining a geographic area of interest for which potential diversion destinations should be ranked or prioritized (task 202). In one embodiment, the processing system 108 automatically identifies the geographic area corresponding to the currently displayed area of a navigational map on the display device 104 as the area of interest. In other embodiments, a user may manipulate the user input device 106 to graphically select or otherwise indicate a geographic area of interest. For example, the user may manipulate the input device 106 to drag-select or click-and-drag over the user's geographic area of interest within the currently displayed area of a navigational map on the display device 104 (e.g., by clicking or selecting an initial location on the navigational map and holding down the button or other actuatable element of the user input device 106 while moving the user input device 106 to another location on the navigational map to define the boundaries of the geographic area of interest between the initial and final locations). In other embodiments, the user may manipulate the input device 106 to define the geographic area of interest as an area or region in the vicinity of a known reference (e.g., a city, navigational reference point, or the like). For example, the user may define the geographic area of interest by specifying a desired distance range (e.g., 25 nautical miles) for the boundaries of a geometric shape (e.g., a circle, square, or the like) centered about a particular reference location. It should be appreciated there are numerous ways to identify a geographic area of interest, and the subject matter described herein is not limited to any particular manner of defining the geographic area for analysis.

The diversion list display process 200 continues by ranking, prioritizing, or otherwise ordering the airports or other landing locations within the geographic area of interest using real-time (or near real-time) status information and the airports' respective viabilities for various parameter groupings (task 204). As described in greater detail below in the context of FIG. 5, the diversion list display process 200 identifies the airports (or other potential diversion destinations) within the geographic area of interest, and for each airport, receives or otherwise obtains current status information for the respective airport, such as, for example, current meteorological conditions, current operating status of the runways at the airport, current airspace restrictions at the airport, and the like. The diversion list display process 200 also obtains current status information for the aircraft 102, such as, for example, the current altitude (or above ground level), the current location of the aircraft 102, the current aircraft heading, the current aircraft velocity, the current amount of fuel remaining onboard the aircraft, and the like.

As described in greater detail below in the context of FIGS. 5-6, for each airport, a respective parameter group viability score is determined for each of a plurality of parameter groups using the real-time status information for that airport and the aircraft. Additionally, a respective parameter group viability state is determined for each of the plurality of parameter groups for the respective airport. Based on the respective parameter group viability states, the airports are then classified into different aggregate viability groups. In this regard, the airports classified into a respective one of the aggregate viability groups represent a subset of the airports within the geographic area of interest having a substantially similar viability status. Each airport is then ranked within its respective viability group based on its respective parameter group viability scores relative to those of other airports within its respective aggregate viability group. Thus, better or more preferred airports may be discerned from other airports with the same general viability. Thereafter, the identified airports within the geographic area of interest are then ranked or otherwise ordered primarily based on the respective aggregate viability groupings and then secondarily based on each respective airports relative ranking within its respective aggregate viability group, resulting in a prioritized list of the potential diversion destinations within the geographic area of interest. In this regard, the airports presented within the diversion list may be ordered independently of any flight plans for the aircraft 102, that is, the planned destination airport for the aircraft 102 may be ranked below other airports based on the parameter group viability states and scores regardless of its flight plan designation.

Still referring to FIG. 2, after ranking the airports within the geographic area of interest, the diversion list display process 200 displays or otherwise presents an ordered list of the ranked airports and provides, on the display, graphical indicia of the respective parameter group viability states for each airport in the list (tasks 206, 208). In this regard, the ordered list displayed on the display device 104 allows a pilot or other user to immediately distinguish which airports are most viable from those that are less viable, while the parameter group viability state indicia allow the pilot to quickly discern the general viability characteristics associated with each individual airport in the list. In exemplary embodiments, each parameter group viability state is rendered with a visually distinguishable characteristic that is different from those of the other parameter group viability states. The visually distinguishing characteristic may include one or more of a visually distinguishable color, hue, tint, brightness, graphically depicted texture or pattern, contrast, transparency, opacity, shading, animation, line type, and/or other graphical effect that visually distinguish a parameter group viability state. In one exemplary embodiment, the diversion list display process 200 supports three different parameter group viability states, with the visually distinguishing characteristics being realized as three distinct colors. For example, the highest or best parameter group viability state may be indicated using a green color, with the lowest or worst parameter group viability state being indicated using a red color, and the intermediate parameter group viability state being indicated using a yellow color.

In exemplary embodiments, the airports presented within the displayed list are selectable, and the diversion list display process 200 displays or otherwise presents detail information for the respective parameter groups for an individual airport in the list in response to selection of that airport (task 210). In this regard, when the user input device 106 is manipulated to select a particular airport on the list, the processing system 108 may generate or otherwise provide a pop-up or other graphical user interface (GUI) display on the display device 104 that includes more specific or detailed information regarding the parameter group viability states for that airport, which may be ordered by perceived relevance as described in greater detail below in the context of FIG. 4. The detail information may include the factors or criteria that primarily governed assigning or classifying a particular viability state to a particular parameter group. For example, in the case of a binary parameter resulting in the lowest viability designation, the detail information may include further information regarding that parameter. Additionally, the detail information may also be displayed or otherwise rendered using the same visually distinguishable characteristic as its associated parameter group viability state. For example, detail information regarding a binary parameter resulting in the lowest viability designation for a particular parameter group may be rendered in red. Conversely, detail information regarding a parameter that contributes to or otherwise results in the highest viability designation for a particular parameter group may be rendered in green.

Figure 3:
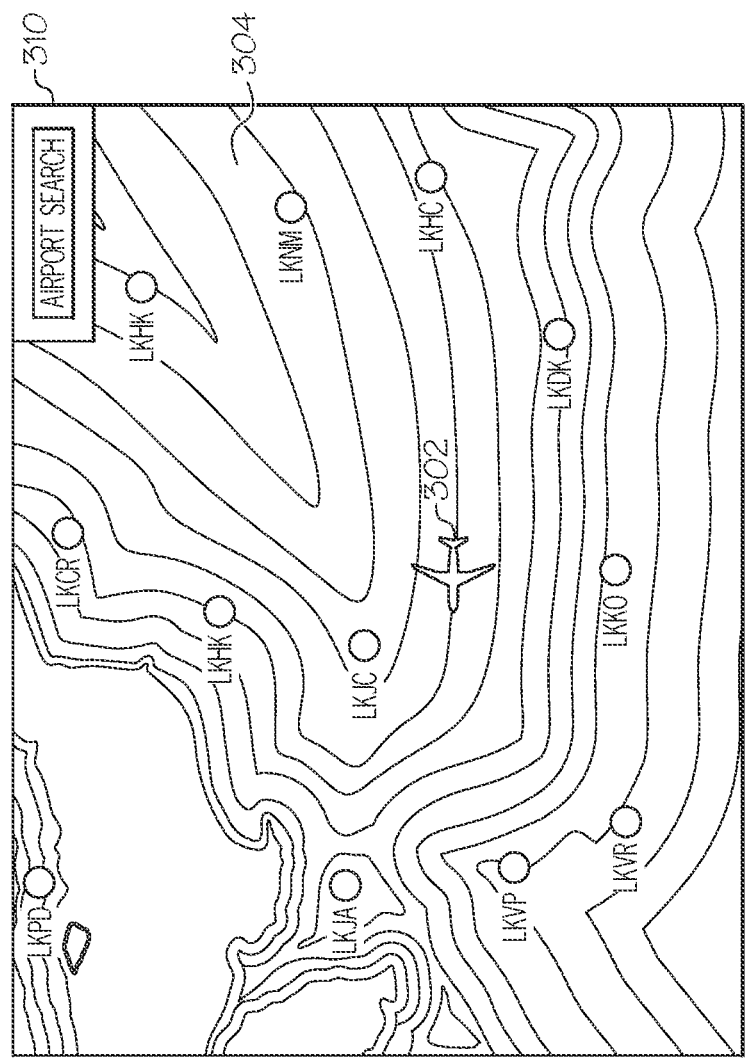
FIGS. 3-4 depict exemplary navigational map displays suitable for display on a display device associated with the aircraft in the system of FIG. 1 in accordance with one or more embodiments of the exemplary diversion list display process of FIG. 2.

FIGS. 3-4 depict an exemplary sequence of navigational map displays that may be displayed, rendered, or otherwise presented on the display device 104 in conjunction with the display process 200 of FIG. 2. The display system 110 and/or processing system 108 displays and/or renders the navigational map 300 on the display device 104. The illustrated navigational map 300 includes a graphical representation 302 of the aircraft 102 overlaid or rendered on top of a background 304. The background 304 comprises a graphical representation of the terrain, topology, navigational reference points, airspace designations and/or restrictions, or other suitable items or points of interest corresponding to the currently displayed area of the navigational map 300, which may be maintained in a terrain database, a navigational database, a geopolitical database, or another suitable database. For example, the display system 110 may render a graphical representation of nearby navigational aids (e.g., VORs, VORTACs, DMEs, and the like) and airports within the currently displayed geographic area of the navigational map 300 overlying the background 304. Some embodiments of navigational map 300 may also include graphical representations of airspace designations and/or airspace restrictions, cities, towns, roads, railroads, and other geo-political information. In addition, depending on the embodiment, the display process 200 may render other real-time flight related information that is within the geographic area corresponding to the currently displayed area of the navigational map 300 or within a particular proximity of the aircraft, such as, for example, weather conditions, radar data, neighboring air traffic, and the like, as will be appreciated in the art. Although FIG. 3 depicts a top view (e.g., from above the aircraft 302) of the navigational map 300 (alternatively referred to as a lateral map or lateral view), in practice, alternative embodiments may utilize various perspective views, such as side views, three-dimensional views (e.g., a three-dimensional synthetic vision display), angular or skewed views, and the like. The displayed area of the navigational map 300 corresponds to the geographic area that is currently displayed in the navigational map 300, that is, the field of view about the center location of the navigational map 300. As used herein, the center location of the navigational map 300 comprises a reference location for the middle or geometric center of the navigational map 300 which corresponds to a geographic location.

In an exemplary embodiment, the navigational map 300 is associated with the movement of the aircraft 102, and the aircraft symbology 302 and/or background 304 refreshes or otherwise updates as the aircraft 102 travels, such that the graphical representation of the aircraft 302 is positioned over the terrain background 304 in a manner that accurately reflects the current (e.g., instantaneous or substantially real-time) real-world positioning of the aircraft 102 relative to the earth. In some embodiments, the aircraft symbology 302 is shown as traveling across the navigational map 300 (e.g., by updating the location of the aircraft symbology 302 with respect to the background 304), while in other embodiments, the aircraft symbology 302 may be located at a fixed position on the navigational map 300 (e.g., by updating the background 304 with respect to the aircraft graphic 302 such that the map 300 is maintained centered on and/or aligned with the aircraft graphic 302). Additionally, depending on the embodiment, the navigational map 300 may be oriented in a cardinal direction (e.g., oriented north-up so that moving upward on the map 300 corresponds to traveling northward), or alternatively, the orientation of the navigational map 300 may be track-up or heading-up (i.e., aligned such that the aircraft symbology 302 is always traveling in an upward direction and the background 304 adjusted accordingly).

In some embodiments, the map 300 may be centered on the aircraft 302 such that the center location of the navigational map 300 corresponds to the current location of the aircraft 302. In this regard, the center location of the navigational map 300 may be updated or refreshed such that it corresponds to the instantaneous location of the aircraft 102 as the aircraft travels, as will be appreciated in the art. In alternative embodiments, the center location of the navigational map 300 may correspond to a geographic location that is independent of the current location of the aircraft 102, for example, when a user manipulates a user input device 106 to scroll the displayed area of the navigational map or select a portion of the displayed area that does not include the aircraft symbology 302.

The illustrated navigational map 300 includes a GUI element 310 (e.g., a button or the like) that is selectable or otherwise manipulable by a user to initiate the display process 200, resulting in the updated navigational map display of FIG. 4 being presented on the display device 104 that includes a graphical representation of an ordered list 402 of potential diversion airports. In this regard, the diversion airport list 402 may be presented within a graphical user interface or window that overlies a peripheral portion of the navigational map 300 and/or terrain background 304 or is otherwise positioned at or near a border of the navigational map 300 (e.g., by automatically adjusting the resolution of the navigational map 300 to concurrently present the previously displayed geographic area and the diversion airport list 402). As described above, the individual airports in the list 402 are ordered primarily based on their respective aggregate viability groupings. In the illustrated embodiment, a first grouping 404 of airports having the highest viability is presented with precedence over a second grouping 406 of airports having an intermediate viability, which, in turn, is presented with precedence over a third grouping 408 of airports having the lowest viability. Within each grouping 404, 406, 408, the airports contained therein are ordered or ranked based on its respective parameter group viability scores relative to those of other airports within its respective aggregate viability group 404, 406, 408. In this regard, within the highest viability group 404, airport LKJA is ranked higher than airport LKHK based on their respective parameter group viability scores, and accordingly, airport LKJA is presented above airport LKHK within the diversion list 402. Similarly, within the intermediate viability group 406, airport LKHC is ranked higher than airport LKDK based on their respective parameter group viability scores, and airport LKHC is presented above airport LKDK in the diversion list 402.

In exemplary embodiments, the diversion list 402 also includes, in association with each respective airport, graphical indicia 410 of the parameter group viability states associated with that airport for each parameter group. In the illustrated embodiment, the graphical indicia 410 is realized as a pie chart where the different sectors (or slices) are representative of the different parameter groups. In this regard, FIG. 4 depicts an embodiment where four different parameter groups are being utilized to rank the airports, however, it should be appreciated that the subject matter is not intended to be limited to any particular number of parameter groups. In some embodiments, the area (e.g., arc length or angle) of each sector of the pie chart corresponds to the relative weighting factor associated with the corresponding parameter group. In this regard, a parameter group may be weighted more heavily than others when scoring the airports, and thus, the sector of the pie chart corresponding to that parameter group may be scaled larger relative to other sectors in a manner corresponding to its relative weighting. That said, in other embodiments, the pie chart may be uniformly divided so that each parameter group sector has identical onscreen dimensions regardless of parameter group weighting factors. It should be noted that the subject matter described herein is not limited to pie charts, and other similar graphics may be utilized to represent the parameter group states in a consolidated manner. Moreover, the parameter groups may be broken out and represented with individual columns or in some other manner. That said, from a human factors perspective, presenting the parameter group states using a consolidated graphical indicia such as a pie chart may declutter the display and conserve onscreen display area for concurrent display of the terrain background 304 and other portions of the navigational map 300 which may be more pertinent to safe operation of the aircraft 102. Additionally, a concise representation allows for faster orientation and understanding of the relative viability and components thereof. For purposes of explanation, the subject matter is described herein in the context of the pie chart indicia 410 depicted in FIG. 4, but it should be appreciated that the subject matter is not necessarily limited to use with pie charts.

Still referring to FIG. 4, each of the sectors of the pie chart indicia 410 for the airports in the highest viability grouping 404 are rendered using the visually distinguishable characteristic associated with the highest parameter group viability state (e.g., green). In this manner, the pilot of the aircraft 102 can quickly identify those airports as having the highest viability state across the various parameter groups. By virtue of their graphical indicia 410 being identical, based on the presentation order and airport LKJA being presented with precedence over airport LKHK (e.g., displayed higher in order), a pilot can quickly identify that airport LKJA was scored higher than airport LKHK based on their individual parameter values, weighting factors, or the like, as described in greater detail below in the context of FIGS. 5-6. In other words, any ties between airports based on parameter group states are intelligently resolved by calculating or otherwise determining an overall score for each of the airports within the grouping, and then ranking the airports within the grouping based on their overall scores.

One or more of the sectors of the pie chart indicia 410 for each of the airports in the intermediate viability grouping 406 are rendered using the visually distinguishable characteristic associated with the intermediate parameter group viability state (e.g., yellow), while remaining sectors of the pie chart indicia 410 for each respective airport are rendered using the visually distinguishable characteristic associated with the highest parameter group viability state (e.g., green). Thus, the pilot of the aircraft 102 can quickly identify the number of parameter groups for a particular airport that do not have the highest viability state, as well as identify which parameter group(s) could potentially compromise or complicate landing at that particular airport (e.g., when a pilot trained or versed in the feature is capable of mentally associating pie chart sectors with their corresponding parameter group). For example, in the illustrated embodiment, a pilot is capable of quickly identifying that airport LKHC in the intermediate grouping 406 has one potentially complicating parameter group state associated therewith, while airport LKDK has the same potentially complicating parameter group state associated therewith along with an additional potentially complicating parameter group state. For any airports having identical graphical indicia 410, or alternatively, an identical number of parameter groups with the intermediate viability state, a pilot can quickly identify which airports were scored higher than others having the same relative viability at the parameter group state level based on their individual parameter values, weighting factors, or the like, as described in greater detail below in the context of FIGS. 5-6.

One or more of the sectors of the pie chart indicia 410 for each of the airports in the lowest viability grouping 408 are rendered using the visually distinguishable characteristic associated with the lowest parameter group viability state (e.g., red), while remaining sectors of the pie chart indicia 410 for each respective airport are rendered using the visually distinguishable characteristic associated with the other parameter group viability states. Again, the pilot of the aircraft 102 can quickly identify the number and identity of parameter groups for a particular airport that have the lowest viability state which may prevent usage of the airport, as well as ascertaining the relative viability of the other parameter group(s) that do not have the lowest viability state. Additionally, for those airports having identical graphical indicia 410, or alternatively, an identical number of parameter groups per viability state, a pilot can quickly identify which of those airports were scored higher than others having the same relative viability at the parameter group state level based on their individual parameter values, weighting factors, or the like.

Still referring to FIG. 4, in exemplary embodiments, the diversion list display process 200 also provides graphical indicia of the parameter group viability states by replacing the airport symbology presented on the navigational map 300 (e.g., the airports within the current geographic area corresponding to the navigational map 300) with updated symbology representative of the parameter group viability states for the airports. In this regard, a consolidated graphical indicia, such as a pie chart, may also be utilized for the airport symbology in lieu of the preceding airport symbology. For example, the symbology overlying the terrain background 304 for airport LKJA may be replaced with a pie chart 412 located at the geographic location associated with airport LKJA and sectors corresponding to the parameter group states for airport LKJA (e.g., all green sectors). Similarly, airport LKVR may be graphically represented on the updated navigational map display with a pie chart 414 at the geographic location associated with airport LKVR and sectors corresponding to the parameter group states for airport LKVR. In this regard, the airport viability symbology 414 for airport LKVR includes one sector with the visually distinguishable characteristic indicating the lowest parameter group state (e.g., red), one sector with the visually distinguishable characteristic indicating the intermediate parameter group state (e.g., yellow), and two other sectors with the visually distinguishable characteristic indicating the highest parameter group state (e.g., high).

Depending on the embodiment, one or more of the airport viability symbologies 412, 414 presented overlying the terrain background 304 and the individual airport entries (or rows) in the list 402 are selectable. In response to selection of either the airport viability symbology 414 for airport LKVR or the entry 416 for airport LKVR in the list 402, the processing system 108 generates or otherwise provides a GUI display 420 overlying the navigational map 300 that includes detail information pertaining to the parameter group states associated with airport LKVR (e.g., task 210). In exemplary embodiments, the detail information associated with the parameter groups is presented in ascending order of viability, such that the detail information associated with any parameter group having the lowest viability state is presented above the detail information associated with any parameter group having the intermediate viability state, which, in turn, is presented above the detail information associated with any parameter group having the highest viability state. For example, in the illustrated embodiment of FIG. 4, the Aircraft Performance parameter group for airport LKVR has the lowest viability state and is presented above the Airport Availability parameter group having the intermediate viability state, and the Airport Availability parameter group is presented above the Weather and Airline Constraint parameter groups having the highest viability state. Thus, the pilot may quickly identify the detail information that may be most critical when assessing whether to attempt to land the aircraft 102 at the selected airport. Additionally, the processing system 108 generates or otherwise provides a graphical indicia 426 of the relationship between the current location of the aircraft 102, 302 and the location of the selected airport represented by symbology 414, which further improves the pilot's situational awareness with respect to the selected airport.

Additionally, in exemplary embodiments, the detail information associated with each parameter group is rendered using the visually distinguishable characteristic associated with its viability state. In this regard, for the embodiment shown in FIG. 4, the detail information text associated with the Aircraft Performance parameter group is presented in red, the detail information text associated with the Airport Availability parameter group is presented in yellow, and the detail information text associated with the Weather and Airline Constraint parameter groups is presented in green. Additionally, the detail information may be presented in association with GUI elements 422 that allow the amount of detail information text presented to be expanded or collapsed. In this regard, in some embodiments, by default, the diversion list display process 200 may automatically present the detail information associated with the lowest or intermediate viability states in an expanded state initially while the detail information associated with the highest viability states is automatically presented in a collapsed state initially, as depicted in FIG. 4. Thus, the pilot is quickly presented with the detail information that may be most critical when assessing whether to attempt to land the aircraft 102 at the selected airport in a decluttered manner while detail information that does not necessarily present any complications with respect to landing at the airport may be obscured, thereby reducing the workload on the pilot. The GUI display 420 may also include a selectable GUI element 424 to input or otherwise enter the selected airport into the flight plan for the aircraft 102. In this regard, in response to selection of the GUI element 424, the processing system 108 may interact with the FMS 116 or another system 114, 118 onboard the aircraft 102 to automatically update the flight plan and related functionality pertaining to execution of the flight plan to reflect the selected airport is now the current destination for the aircraft 102.

It should be appreciated that the ordered diversion list 402 in conjunction with the graphical indicia 410, 412, 414 of the parameter group states for the airports in the geographic area of interest and the detail information display 420 allows the pilot to more quickly ascertain and compartmentalize the relative viability of a number of different airports. Thus, a pilot can essentially achieve a complete assessment of the potential diversion options in a more expedient manner. At the same time, the stress and workload on the pilot workload is also reduced, while the likelihood of the pilot overlooking important pieces of information is reduced by consolidating information from various sources into parameter groups that are assigned a particular viability state represented in a visually distinguishable manner.

It should be noted that although the diversion list display process 200 is described in the context of a geographic area of interest for purposes of explanation, the number of airports presented in the diversion list 402 need not correspond directly to a particular geographic area of interest. For example, in embodiments where an identified geographic area of interest includes a relatively large number of airports that cannot be presented on the display device 104 in a legible manner, the display process 200 may present only a threshold number of airports having the highest viability for the geographic area of interest (e.g., only the top 10 airports within the currently displayed geographic area of the navigational map). In such embodiments, if the geographic area of interest corresponds to the geographic area currently displayed in the navigational map, any airports having a viability that falls below the presentation threshold may be removed from the navigational map when the diversion list is presented. Conversely, if the geographic area of interest includes only a few airports, the diversion list display process 200 may automatically identify one or more additional airports outside the geographic area that are closest to that geographic area (or alternatively, the current location of the aircraft) or are otherwise within range of the aircraft 102 based on the current amount of fuel remaining onboard. Thus, the diversion list may include one or more airports not currently presented on the navigational map.

Figure 5:
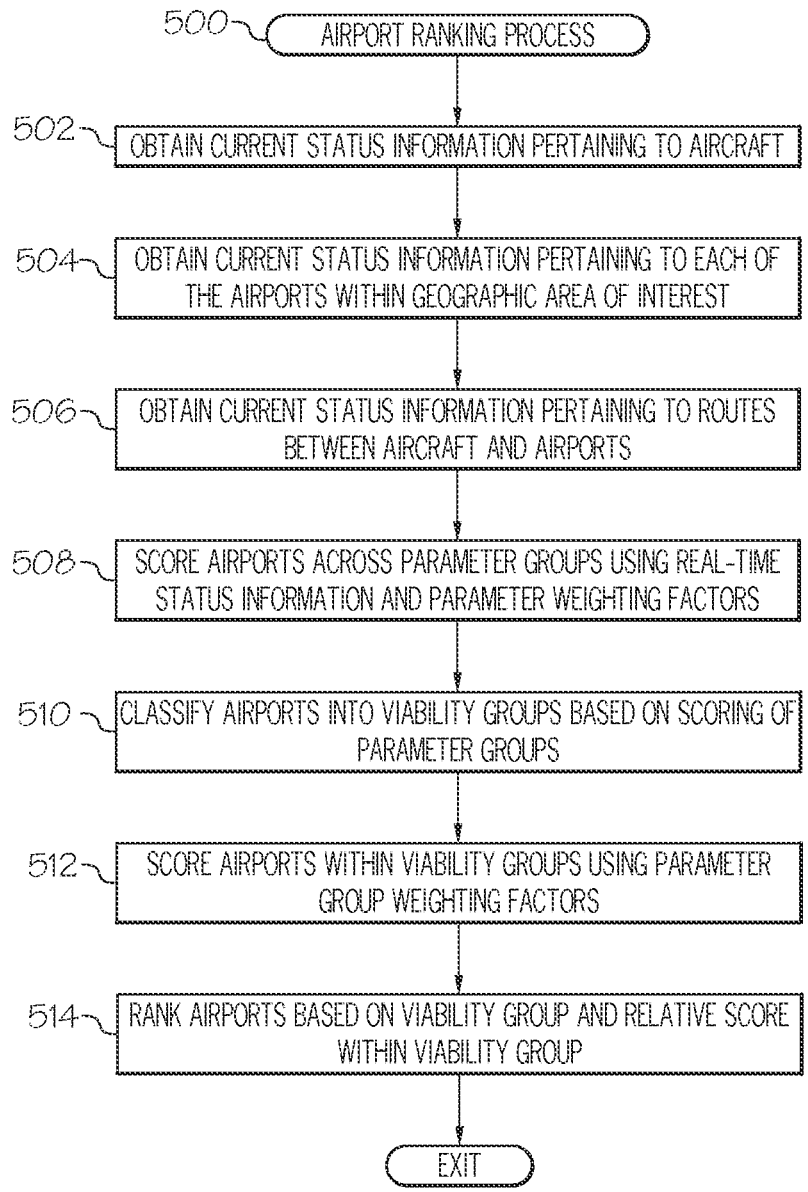
FIG. 5 is a flow diagram of an exemplary airport ranking process suitable for use with the diversion list display process of FIG. 2 in accordance with one or more embodiments.

Referring now to FIG. 5, in one exemplary embodiment, an airport ranking process 500 is performed in conjunction with the diversion list display process 200 of FIG. 2 to rank airports for presentation in an ordered diversion list (e.g., task 204). The various tasks performed in connection with the illustrated process 500 may be implemented using hardware, firmware, software executed by processing circuitry, or any combination thereof. For illustrative purposes, the following description may refer to elements mentioned above in connection with FIG. 1. In practice, portions of the airport ranking process 500 may be performed by different elements of the system 100; however, for purposes of explanation, the airport ranking process 500 may be described herein primarily in the context of being performed by the processing system 108. Again, it should be appreciated that the airport ranking process 500 may include any number of additional or alternative tasks, may not be performed in the illustrated order, one or more of the tasks may be performed concurrently or omitted, and/or the airport ranking process 500 may be incorporated into a more comprehensive procedure or process having additional functionality not described in detail herein.

Referring to FIG. 5, and with continued reference to FIGS. 1-4, in exemplary embodiments, the airport ranking process 500 is performed when a user indicates a desire to review or otherwise analyze potential diversion airports for deviating from a planned travel route; however, in other embodiments, the airport ranking process 500 may be performed periodically or continuously as a background process to facilitate more expedient presentation of the potential diversion airports as desired. The airport ranking process 500 receives or otherwise obtains current status information pertaining to the aircraft (task 502). The current status information pertaining to the aircraft 102 generally represents the instantaneous, real-time or most recent available values for one or more parameters that quantify the current operation of the aircraft 102. In this regard, the current aircraft status information provides one or more base parameters for scoring or otherwise grading the viability of an airport with respect to one or more parameters groups, as described in greater detail below. For example, the processing system 108 may obtain (e.g., from FMS 116, navigation system 114 and/or other avionic systems 118) one or more of the following: the current flight phase for the aircraft 102, the current location of the aircraft 102 (or a particular distance from a navigational reference point or a desired track), the current altitude (or above ground level) of the aircraft 102, the current heading (or bearing) of the aircraft 102, the current amount of fuel remaining onboard the aircraft 102, the current engine status (e.g., whether any engine is disabled, whether afterburners are in operation, the current revolutions per minute, and/or the like), the current aircraft configuration (e.g., the current flap configuration). Additionally, the processing system 108 may obtain, either from the onboard detection systems 120 or an external system via communications system 112, current meteorological conditions at or near the current location of the aircraft 102 (e.g., the current temperature, wind speed, wind direction, atmospheric pressure, turbulence, and the like), the current air traffic or other obstacles at or near the current location of the aircraft 102, and the like.

Additionally, the airport ranking process 500 receives or otherwise obtains current status information pertaining to the airports to be analyzed (task 504). In this regard, the current status information pertaining to the airports generally represents the instantaneous, real-time or most recent available information that quantifies the current operations at the respective airports within the geographic area of interest for the diversion list display process 200. The current airport status information associated with a particular airport provides one or more base parameters for scoring or otherwise grading the viability of that airport with respect to one or more parameters groups, as described in greater detail below. For example, the processing system 108 may obtain, for each airport, one or more of the following: the current meteorological conditions at or near the airport, the current operational status of the runways and/or taxiways at the airport, the current air traffic conditions for the airport, any current auxiliary reports applicable to the airport (e.g., NOTAMs, PIREPs, SIGMETs, and the like), any current airspace restrictions, current meteorological forecast information for the geographic area encompassing the airport, and the like.

The illustrated embodiment of the airport ranking process 500 also receives or otherwise obtains current status information pertaining to routes between the current location of the aircraft and any one or more of the airports being analyzed (task 506). In this regard, based on the current location of the aircraft 102 and the respective locations of the airports being analyzed, the processing system 108 may identify or otherwise determine the waypoints or other intervening navigational reference points between the current location of the aircraft 102 and a respective airport location that could be utilized to navigate to that airport location, or could otherwise be utilized to assess navigation to that airport location. In a similar manner, the processing system 108 then obtains, for each of the identified intervening navigational reference points, one or more of the following: the current meteorological conditions at or near the navigational reference point, current meteorological forecast information for the geographic area encompassing the navigational reference point, any current auxiliary reports for a geographic area encompassing the navigational reference point, and the like. The current status information associated with a particular navigational reference point or route between the current location of the aircraft and a particular airport provides one or more base parameters for scoring or otherwise grading the viability of that airport with respect to one or more parameters groups, as described in greater detail below.

After obtaining current status information relevant to the aircraft and the airports to be analyzed, the airport ranking process 500 scores or otherwise grades each of the airports across a plurality of different parameter groups using the current status information pertaining to the respective airport and any applicable parameter weighting factors (task 508). As described in greater detail below in the context of FIG. 6, for each airport, current status parameters associated with the aircraft and the airport, along with any available status parameters associated with the route from the current aircraft location to the airport location, are classified or categorize into one of a plurality of parameter groups. In this regard, each parameter group generally represents a consolidation or integration of parameters that quantify a particular aspect of viably accessing or landing at an airport. For example, in the illustrated embodiment of FIG. 4, the parameter groups correspond to Aircraft Performance (e.g., parameters quantifying the ability of the aircraft to perform a landing at the airport), Airport Availability (e.g., parameters quantifying the ability of the airport to accommodate the aircraft), Weather (e.g., parameters quantifying potential meteorological impacts on traveling to and/or landing at the airport), and Airline Constraints (e.g., parameters quantifying other criteria or preferences pertaining to use of the airport). As another example embodiment, the parameters may be classified into one of the following groupings: an airport accessibility parameter group (e.g., en route weather, aircraft performance, fuel criteria, airspace restrictions, etc.), an airport availability parameter group (e.g., runway status, weather at the airport, air traffic at the airport, and the like), an aircraft configuration parameter group (e.g., type of aircraft, current configurations or operating conditions of mechanical components, or the like), and an airline preferences parameter group (e.g., based on airline contracts with the airport, ground services at the airport, number of passengers onboard the aircraft, and the like). It should be noted that any number or type of parameter groups may be utilized to organize parameters influencing viability of landing at an airport, however, from a human factors perspective, consolidating the parameters into a relatively small number of parameter groups facilitates more expedient analysis by an aircraft operator. In this regard, fewer than four parameter groups could be utilized in some embodiments.

In addition to classifying the base parameters into parameter groups, exemplary embodiments also calculate or otherwise determine complex parameters derived based at least in part on one or more current status base parameters. For example, a runway viability parameter may be calculated for an active runway at a particular airport of interest based on the length of the runway, the current meteorological conditions at the airport, the current weight of the aircraft, and other parameters influencing the braking performance of the aircraft. In this regard, the processing system 108 may calculate the length required to stop the aircraft 102 based on the anticipated aircraft weight at the estimated time of arrival for the airport, the landing speed for the aircraft, and the anticipated surface conditions of the runway based on the current meteorological conditions at the airport. From there, the processing system 108 may determine a runway viability parameter value that quantifies the difference between the length required to stop the aircraft 102 and the runway length. The runway viability parameter value may then be classified into the appropriate parameter group for a given embodiment (e.g., Airport Availability). Again, it should be noted that any number or type of complex parameters may be calculated and classified into the appropriate parameter group.

Once the base and complex parameters for an airport are classified into the appropriate parameter groups, the processing system 108 determines a cumulative parameter group viability state and a cumulative parameter group viability score for each parameter group. In this regard, the cumulative parameter group viability score is determined based on the constituent parameters classified into that parameter group, with the cumulative parameter group viability state being dictated by a binary parameter classified into the parameter group or the parameter group viability score, as described in greater detail below in the context of FIG. 6. Depending on the embodiment, the parameter group viability score may be calculated as a weighted combination of the constituent parameters, applying fuzzy logic to the constituent parameters, or a combination thereof. The parameter group viability states and scores for each airport are maintained in association with the airport.

After scoring the airports, the airport ranking process 500 classifies the airports within to viability groups based on the scoring (task 510). In exemplary embodiments, the processing system 108 classifies the airports based on their respective parameter group viability states across all of the parameter groups, as described above. For example, airports having the highest parameter group viability state for each of the parameter groups may be classified into the highest viability airport grouping (e.g., grouping 404), airports having the lowest parameter group viability state for at least one of the parameter groups may be classified into the lowest viability airport grouping (e.g., grouping 408), with the remaining airports being classified into an intermediate viability airport grouping (e.g., grouping 406).

In the illustrated embodiment, the airport ranking process 500 scores or otherwise grades each of the airports within based on their respective parameter group scores and then ranks each of the airports within their respective viability groups based on that scoring relative to others in that group (tasks 512, 514). In an exemplary embodiment, for each airport classified in the highest viability airport grouping, a cumulative viability score is calculated as a weighted combination of the individual parameter group scores associated with the airport. In this regard, weighting factors may be assigned by an airline operator, the pilot, or another individual to increase the influence of a particular parameter group score relative to the other parameter groups. For example, the viability score for the aircraft performance parameter group may be weighted more heavily than the airport availability parameter group viability score and the weather parameter group viability score, with the airline constraint parameter group viability score being weighted to have the least influence on the cumulative viability score. For other airport groupings, fuzzy logic and weighting factors may be applied to determine a cumulative viability score for each airport as some combination of its associated parameter group viability scores and its associated parameter group viability states other than those having the highest parameter group viability state. Within each grouping, the constituent airports are then sorted, ranked, or otherwise ordered based on their cumulative viability scores from most viable to least viable. In this manner, the airports are ranked primarily by viability groupings, and secondarily based on their cumulative viability scores relative to other airports within a particular viability grouping, as described above in the context of FIGS. 2-4.

Figure 6:
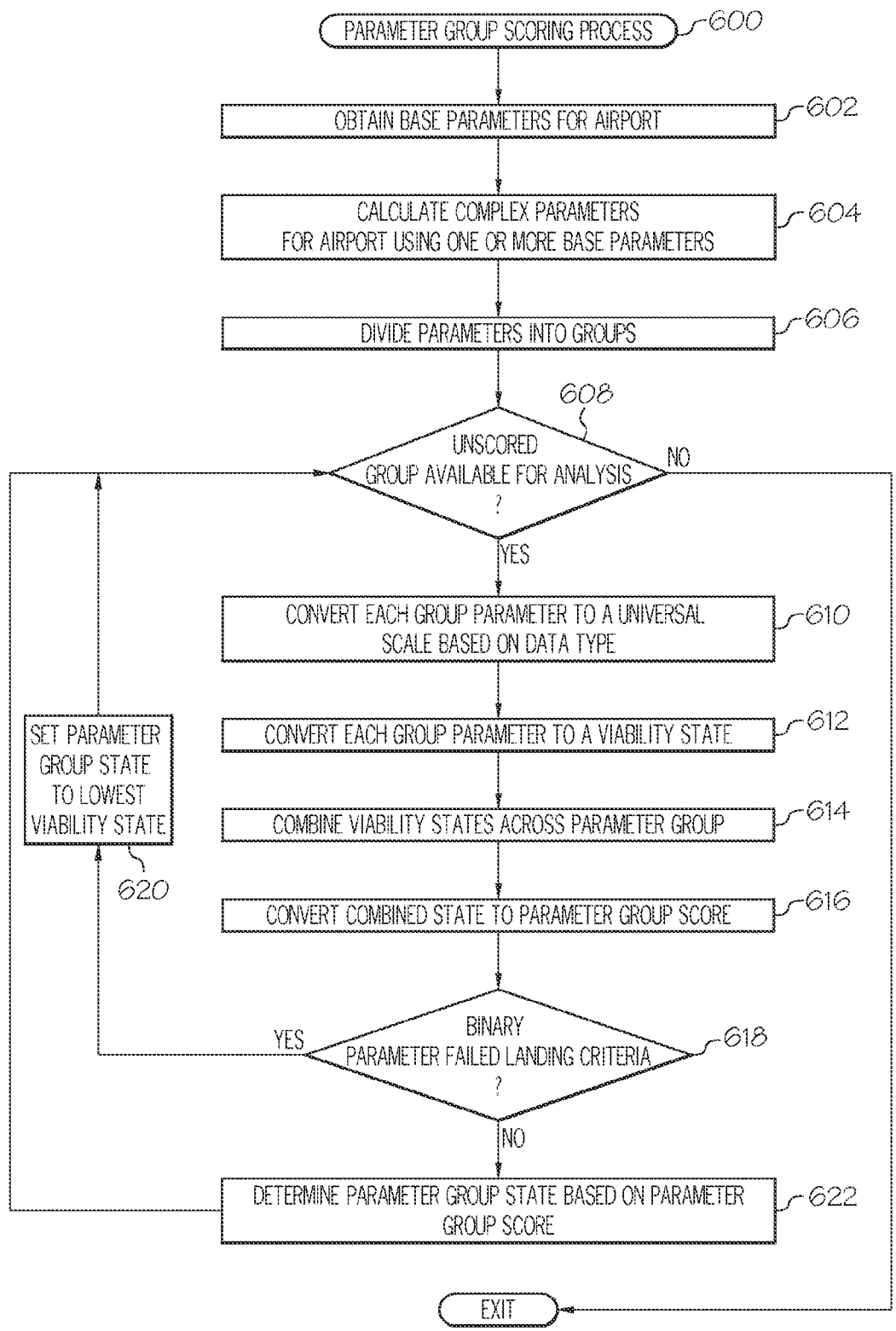
FIG. 6 is a flow diagram of an exemplary parameter group scoring process suitable for use with the airport ranking process of FIG. 5 in conjunction with the diversion list display process of FIG. 2 in accordance with one or more embodiments.

Referring now to FIG. 6, in one exemplary embodiment, a parameter group scoring process 600 is performed in conjunction with the airport ranking process 500 of FIG. 5 to score an airport across a plurality of parameter groups (e.g., task 508). The various tasks performed in connection with the illustrated process 600 may be implemented using hardware, firmware, software executed by processing circuitry, or any combination thereof. For illustrative purposes, the following description may refer to elements mentioned above in connection with FIG. 1. In practice, portions of the scoring process 600 may be performed by different elements of the system 100; however, for purposes of explanation, the scoring process 600 may be described herein primarily in the context of being performed by the processing system 108. Again, it should be appreciated that the scoring process 600 may include any number of additional or alternative tasks, may not be performed in the illustrated order, one or more of the tasks may be performed concurrently or omitted, and/or the scoring process 600 may be incorporated into a more comprehensive procedure or process having additional functionality not described in detail herein.

The scoring process 600 may be performed any number of times in connection with the airport ranking process 500, with each iteration of the scoring process 600 corresponding to an individual airport being analyzed for purposes of presentation in an intelligently ordered diversion list. In this regard, the scoring process 600 begins by receiving, obtaining, or otherwise identifying the base parameters pertinent to landing at the airport currently being analyzed, calculating or otherwise determining one or more complex parameters associated with the airport using one or more of the base parameters, and then dividing, categorizing, or otherwise classifying the base and complex parameters into their corresponding parameter groups (task 602, 604, 606). In this regard, the processing system 108 obtains current status base parameters characterizing or quantifying the current state of the aircraft 102, the current state of the airport being analyzed, and any current status base parameters capable of characterizing or quantifying an anticipated route of travel between the current location of the aircraft 102 and the airport (e.g., tasks 502, 504, 506). Thereafter, the processing system 108 calculates any complex parameters that can be derived from the available base parameters to further quantify or characterize the potential viability of landing at the airport. For example, as described above, a runway viability parameter for the airport may be calculated based on the length of an active runway at the airport (e.g., based on current status information for the airport indicating the runway is available for use), the current meteorological conditions at the airport, the current weight of the aircraft 102, and other parameters influencing the braking performance of the aircraft 102. As another example, calculation of aircraft range in the direction of a potential destination may entail calculating fuel consumption requirements based on the following base parameters: available fuel, route to destination (either direct or indirect depending on circumstances), meteorological parameters (e.g., tailwind component and the like), aircraft performance parameters (e.g., engine status and the like), which, in turn, may yield the maximum range towards the destination and fuel remaining at destination as two complex parameters. Additionally, the calculated amount of fuel remaining may be utilized to calculate other complex parameters, such as the aircraft weight at the destination, which may further be compared to maximum landing weight or other landing viability criteria for the particular destination. Thereafter, the base and complex parameters are assigned to or otherwise associated with a particular parameter group (e.g., an accessibility group, an availability parameter group, a meteorological parameter group, a preferences parameter group, or the like).

After the parameters for a particular airport have been classified into groups, the scoring process 600 proceeds by determining a viability state and score for each of the parameter groups (task 608). The scoring process 600 first normalizes or otherwise converts each parameter within a parameter group to a common or universal scale to facilitate combining the parameters (task 610). In this regard, based upon the particular data type associated with each parameter, its value is converted to a numerical representation on a scale in common with the other parameters in the group. For example, in one embodiment, three different parameter data types are supported (e.g., binary, continuous, and discrete), and each parameter is normalized to a scale from 0 to 1, with 0 representing the lowest possible viability and 1 representing the highest possible viability. In such an embodiment, any parameters having a binary data type (e.g., where one potential value is viable and the other potential value(s) are not viable) associated therewith are then classified as either 0 or 1. Any parameters having a continuous data type are scaled to a value between 0 and 1, for example, by converting the parameter value to a ratio of the potential range of the continuous parameter (e.g., by dividing the parameter value by a maximum value for the parameter). Any parameters having a continuous data type are scaled to a value between 0 and 1, for example, by converting the parameter value to a ratio of the potential range of the continuous parameter (e.g., by dividing the parameter value by a maximum value for the parameter). Lastly, any parameters having a discrete data type are converted to a corresponding value between 0 and 1, for example, by using a priori knowledge or expert judgment to assign a viability value between 0 and 1 to each potential discrete state for that parameter. For example, a runway surface condition parameter (which may be a complex parameter determined based on current or forecasted meteorological information for the airport location) may be quantified as follows: a clear or non-impacted surface condition state assigned a value of 1.0, a wet surface condition state assigned a value of 0.6, a snowy surface condition state assigned a value of 0.3, and an icy surface condition state assigned a value of 0.1.

Once the parameters of the group are on the same scale, exemplary embodiments of the scoring process 600 converts the value of each parameter to a corresponding viability state representation, combines the viability state representations of all the parameters of the group, and then converts that combined result to a corresponding parameter group score (tasks 612, 614, 616). Fuzzy logic or a fuzzy regulator may be employed to convert the normalized parameter values into discrete viability states and then calculate the parameter group score as a weighted combination of the viability states (e.g., by multiplying or otherwise scaling the influence of each particular parameter using an associated parameter weighting factor). For example, each viability state may be represented by a state function placed at the normative value of the state (e.g. intermediate state placed at 0.5 with a triangular function showing pertinence to the state). The state functions for various states may overlap. A normalized value of a parameter is then represented by a sum of one or more state functions multiplied with respective relevance. The sum can then be weighted or scaled to adjust the influence of the parameter on the viability score. In this regard, the pilot, airline operator, or other user may tune the parameter group scoring in a desired manner to weight some parameters more heavily than others (otherwise, weighting factors for each parameter may be defaulted to the same value or unused). State functions of all parameters are then summed into the combined viability state. The combined viability state resulting from the weighted combination of individual parameter viability states is then converted to a corresponding parameter group score by defuzzification, for example, by taking the center of gravity (COG) of the combined viability state on a [0,1] interval. The position of the center of gravity then dictates one or more viability states with respective pertinence, and the most pertinent viability state is used as the parameter group score. The parameter group score is then stored or otherwise maintained in association with the airport and thereby numerically quantifies or characterizes the relative viability of that aspect of landing at the airport (e.g., accessibility, availability, or the like).

The scoring process 600 also assigns or otherwise designates a viability state to each parameter group. In this regard, in the event the parameter group includes a binary parameter having a value (e.g., 0) that fails to satisfy an applicable criterion for landing the aircraft at an airport, the scoring process 600 automatically assigns or otherwise sets the parameter group state to the lowest viability state regardless of the parameter group score (tasks 618, 620). Conversely, when the parameter group does not include any binary parameters that fail applicable landing criteria, the scoring process 600 determines the parameter group viability state based on the parameter group score (task 622), for example, by using fuzzy logic or a fuzzy regulator in a similar manner as described above (e.g., task 616) to correlate the parameter group score to a viability state. The parameter group viability state and group viability score are also stored or otherwise maintained in association with the airport to quantify or characterize that aspect of landing at the airport in a discrete manner.

The loop defined by tasks 608, 610, 612, 614, 616, 618, 620 and 622 repeats for every parameter group associated with a particular airport. Thereafter, the parameter group viability states determined by the scoring process 600 and associated with that particular airport are then utilized to classify or otherwise order that airport into a particular viability grouping (e.g., task 510), with the parameter group scores determined by the scoring process 600 and associated with that particular airport being utilized to determine a cumulative viability score and rank or otherwise order that airport within its viability grouping (e.g., tasks 512, 514). In this manner, the parameter group viability states are used to discretely categorize and order the airports at a relatively coarse granularity, and the parameter group viability scores are used to further order the airports with finer granularity. As a result, the task of resolving the particular nuances that may make one airport a better diversion destination than another airport having an identical viability state is offloaded from the pilot or other user.

By virtue of the subject matter described herein, the pilot or other vehicle operator can quickly ascertain the current (or real-time) qualitative viability of potential diversion destinations relative to others and the quantitative viability of potential diversion destinations relative to others having the same qualitative viability. In addition to being able to ascertain the high-level viability, the pilot or other vehicle operator can also quickly ascertain qualitative viability of the individual components of a destination's overall viability (e.g., the parameter group viability states), which can then be further reviewed by selecting a particular destination. Thus, the tasks of mentally or manually aggregating information for each individual destination (as well as the route thereto) from a variety of sources, determining any complex parameters for each individual destination, determining whether each individual destination satisfies any particular preferences, contractual agreements, or other ancillary requirements, and then assessing the relative viability or fitness of a particular destination over all of the other potential options is largely offloaded from the pilot or vehicle operator. Accordingly, the mental workload and stress is reduced (which helps to reduce any operator error), situational awareness is improved, and the time required to select an optimal diversion destination can be reduced.

For the sake of brevity, conventional techniques related to graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of presenting potential destinations for a vehicle, the method comprising:
    obtaining a first set of one or more base parameters indicative of a current status of the vehicle;
    for each destination of the plurality of destinations:
        obtaining a second set of one or more base parameters indicative of a current status of the respective destination of the plurality of destinations;
        determining, by a processing system, a qualitative cumulative parameter group state for each parameter group of a plurality of different parameter groups based at least in part on the current status for the vehicle and the current status for the respective destination of the plurality of destinations, wherein:
            each parameter group of the plurality of different parameter groups comprises one or more base parameters of the first and second sets quantifying an aspect of accessing the respective destination of the plurality of destinations; and
            the qualitative cumulative parameter group state for each parameter group is determined based at least in part on the one or more base parameters of the respective parameter group; and
        classifying, by the processing system, the respective destination of the plurality of destinations into a respective aggregate viability group of a plurality of different aggregate viability groups based at least in part on the qualitative cumulative parameter group states associated with the respective destination of the plurality of destinations, each of the aggregate viability groups comprising a subset of the plurality of destinations; and displaying, by the processing system on a display device, a list comprising the plurality of destinations ordered primarily by the respective aggregate viability group classifications.

2. The method of claim 1, further comprising:

determining, for each destination of the plurality of destinations, a cumulative score associated with the respective destination across the plurality of different parameter groups based at least in part on the current status for the vehicle and the current status for the respective destination of the plurality of destinations; and for each aggregate viability group of the plurality of aggregate viability groups, ordering the subset of the plurality of destinations classified into that respective aggregate viability group based on the cumulative scores for the respective destinations of the subset, wherein the list comprises the plurality of destinations ordered primarily by the aggregate viability group classifications and ordered secondarily by the cumulative scores within each respective aggregate viability group.

3. The method of claim 1, further comprising providing, for each destination of the plurality of destinations, graphical indicia of the qualitative cumulative parameter group states associated with the plurality of different parameter groups for the respective destination of the plurality of destinations within the list.

4. The method of claim 1, wherein:

obtaining the first set of one or more base parameters comprises obtaining, by the processing system onboard the vehicle, current values for the first set of one or more base parameters from one or more systems onboard the vehicle;

obtaining the second set of one or more base parameters comprises the processing system obtaining current values for the second set of one or more base parameters for each destination of the plurality of destinations via a communications system onboard the vehicle; and displaying the list comprises generating, by the processing system on a display device onboard the vehicle, a graphical user interface including the plurality of destinations ordered based at least in part on the respective aggregate viability group classifications.

5. The method of claim 4, further comprising:

determining, for each destination of the plurality of destinations, qualitative cumulative parameter group states for the plurality of different parameter groups based at least in part on the current values for the first set of one or more base parameters and the current values for the second set of one or more base parameters for that respective destination of the plurality of destinations; and providing, for each destination of the plurality of destinations, graphical indicia of the respective qualitative cumulative parameter group states associated with the respective destination of the plurality of destinations within the list.

6. The method of claim 4, further comprising determining, by the processing system for each destination of the plurality of destinations, values for one or more complex parameters based at least in part on one or more of the current values for the first set of one or more base parameters and one or more of the current values for the second set of one or more base parameters associated with the respective destination, wherein:

classifying the plurality of destinations into the plurality of aggregate viability groups comprises classifying each destination of the plurality of destinations into a respective one of the plurality of aggregate viability groups based at least in part on the current values for the first set of one or more base parameters, the current values for the second set of one or more base parameters associated with the respective destination, and the values for one or more complex parameters associated with the respective destination.

7. The method of claim 1, further comprising obtaining status information pertaining to a route between a vehicle location and a first destination of the plurality of destinations, wherein classifying the plurality of destinations comprises classifying the first destination into a respective one of the plurality of aggregate viability groups based at least in part on the status information pertaining to the route between the vehicle location and the first destination.

8. A computer-readable medium having computer-executable instructions stored thereon that, when executed by the processing system onboard the vehicle, cause the processing system to perform the method of claim 1.

9. A system comprising:

a display device onboard a vehicle;

one or more systems onboard the vehicle to obtain first values for a first set of one or more base parameters, the first values being indicative of a current status of the vehicle;

a communications system onboard the vehicle to obtain, for each destination of a plurality of destinations, second values for a second set of one or more base parameters, the second values associated with a respective destination being indicative of a current status of the respective destination; and a processing system coupled to the communications system, the one or more systems onboard the vehicle, and the display device to:

determine a qualitative cumulative parameter group state for each parameter group of a plurality of different parameter groups for each destination of the plurality of destinations based at least in part on the first values and the second values associated with the respective destination, wherein:

each parameter group of the plurality of different parameter groups comprises one or more base parameters of the first and second sets quantifying an aspect of accessing the respective destination of the plurality of destinations; and the qualitative cumulative parameter group state for each parameter group is determined based at least in part on the one or more base parameters of the respective parameter group;

classify each destination of the plurality of destinations into a respective one of a plurality of different aggregate viability groups based at least in part on the qualitative cumulative parameter group states associated with the respective destination, each aggregate viability group of the plurality of different aggregate viability groups comprising a subset of the plurality of destinations; and display a listing of the plurality of destinations ordered primarily by their respective aggregate viability group classifications on the display device.

10. The system of claim 9, wherein the processing system scores each destination of the plurality of destinations across the plurality of different parameter groups using the first values and the second values associated with the respective destination and classifies each destination of the plurality of destinations into the respective one of the plurality of different aggregate viability groups based at least in part on the scoring of the respective destination across the plurality of different parameter groups.

11. The system of claim 10, the scoring comprising the qualitative cumulative parameter group states for each parameter group of the plurality of different parameter groups, wherein the listing includes, for each destination of the plurality of destinations, graphical indicia of the qualitative cumulative parameter group states associated with the respective destination of the plurality of destinations for each parameter group of the plurality of different parameter groups.

12. The system of claim 11, wherein the processing system displays a navigational map associated with the vehicle on the display device and displays second graphical indicia of the qualitative cumulative parameter group states associated with each respective destination of the plurality of destinations on the navigational map at a location corresponding to a geographic location of the respective destination.

13. A method of presenting potential diversion airports for an aircraft, the method comprising:
obtaining, by a processing system onboard the aircraft from one or more systems onboard the aircraft, current values for a first set of one or more base parameters representative of a current status of the aircraft;
for each airport of a plurality of airports:
obtaining, by the processing system via a communications system onboard the aircraft, current values for a second set of one or more base parameters representative of a current status of the respective airport;
determining, by the processing system, a qualitative cumulative parameter group state for each parameter group of a plurality of different parameter groups based at least in part on the current values for the first set of one or more base parameters and the current values for the second set of one or more base parameters associated with the respective airport, wherein:
each parameter group of the plurality of different parameter groups comprises one or more base parameters of the first and second sets quantifying an aspect of landing at the respective airport; and
the qualitative cumulative parameter group state for each parameter group is determined based at least in part on the one or more base parameters of the respective parameter group; and
classifying, by the processing system, the respective airport into a respective one of a plurality of different aggregate viability groups based on the qualitative cumulative parameter group states; and
displaying, by the processing system on a display device onboard the aircraft, a listing of the plurality of airports, wherein the listing is ordered primarily by the respective aggregate viability group associated with each respective airport of the plurality of airports.

14. The method of claim 13, further comprising the processing system displaying, for each airport of the plurality of airports, graphical indicia of the qualitative cumulative parameter group states in the listing in association with the respective airport.

15. The method of claim 13, further comprising:
displaying, on the display device, a navigational map associated with the aircraft; and
displaying, for each airport of the plurality of airports, graphical indicia of the qualitative cumulative parameter group states associated with the respective airport at a respective location on the navigational map corresponding to a geographic location of the respective airport.

16. The method of claim 13, further comprising, for each airport of the plurality of airports:
determining parameter group scores for the plurality of different parameter groups based at least in part on the current values for the first set of one or more base parameters and the current values for the second set of one or more base parameters associated with the respective airport;
determining a cumulative score based at least in part on the parameter group scores; and
ranking the respective airport within its respective one of the plurality of different aggregate viability groups, wherein the listing is ordered primarily by the plurality of different aggregate viability groups and ordered secondarily by the ranking of the respective airports within each respective aggregate viability group of the plurality of different aggregate viability groups.

17. The method of claim 1, wherein:
the vehicle comprises an aircraft;
the plurality of destinations comprise a plurality of airports; and
the plurality of different parameter groups comprises at least one of an aircraft performance parameter group, an airport availability parameter group, a weather parameter group, and an airline parameter group.

18. The method of claim 1, wherein displaying the list comprises preferentially displaying respective destinations classified into a highest aggregate viability group of the plurality of different aggregate viability groups relative to respective destinations classified into one or more lower aggregate viability groups of the plurality of different aggregate viability groups.

19. The method of claim 1, further comprising, for each respective destination of the plurality of destinations, displaying, on the display device, symbology representative of respective destination, wherein the symbology includes indicia of the qualitative cumulative parameter group states associated with the respective destination.

20. The method of claim 19, wherein the symbology comprises a pie chart including sectors corresponding to the plurality of different parameter groups, wherein each sector has a visually distinguishable characteristic indicating the qualitative cumulative parameter group state for the respective parameter group associated with the respective sector.

* * * * *